June 3, 1941.  R. P. NORTON  2,243,976
PIPE END CUTTING AND GRINDING MACHINE
Filed Oct. 16, 1939  2 Sheets-Sheet 1
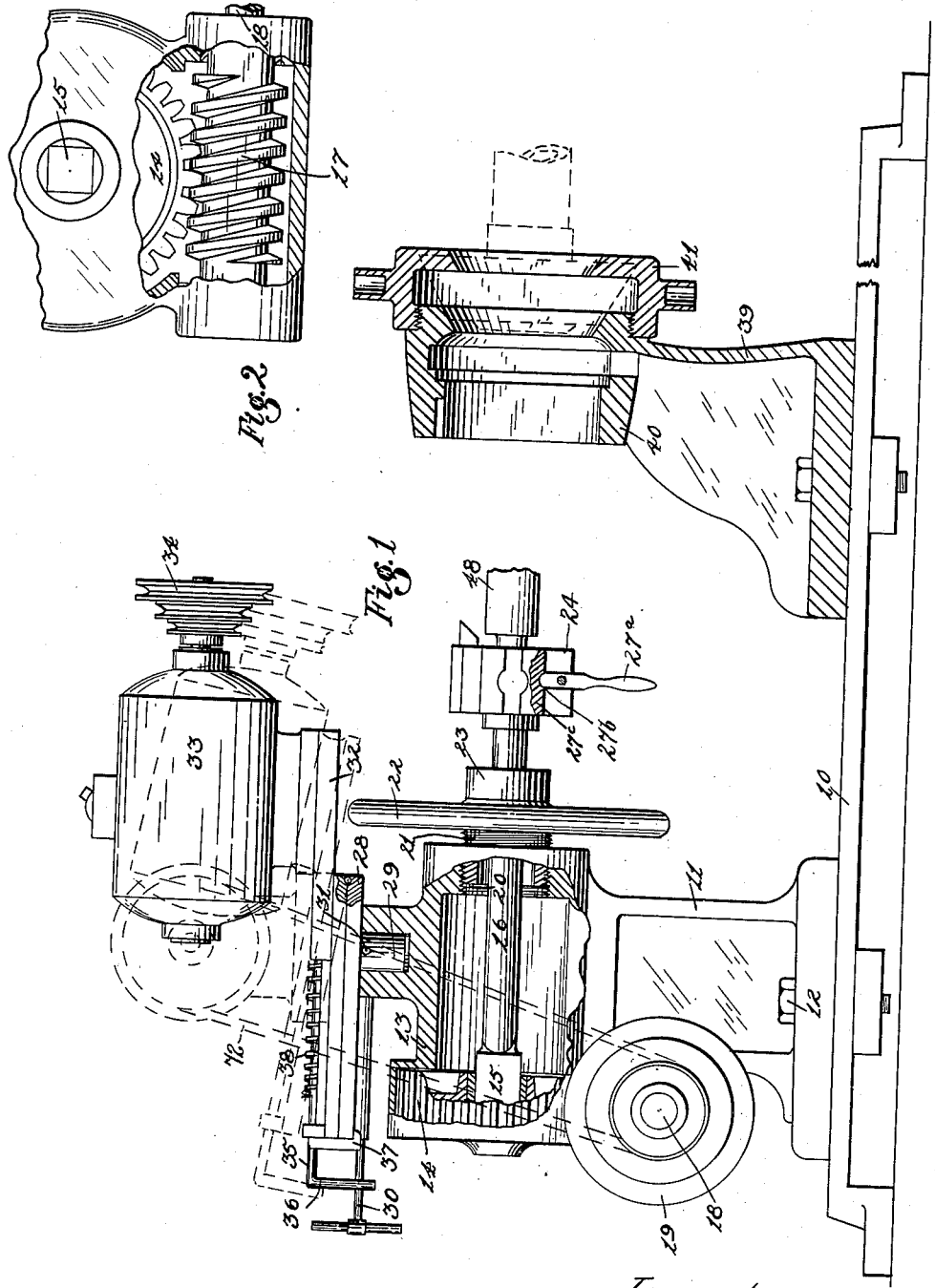
Inventor:
Raymond P. Norton
By Orwig & Hague Att'ys

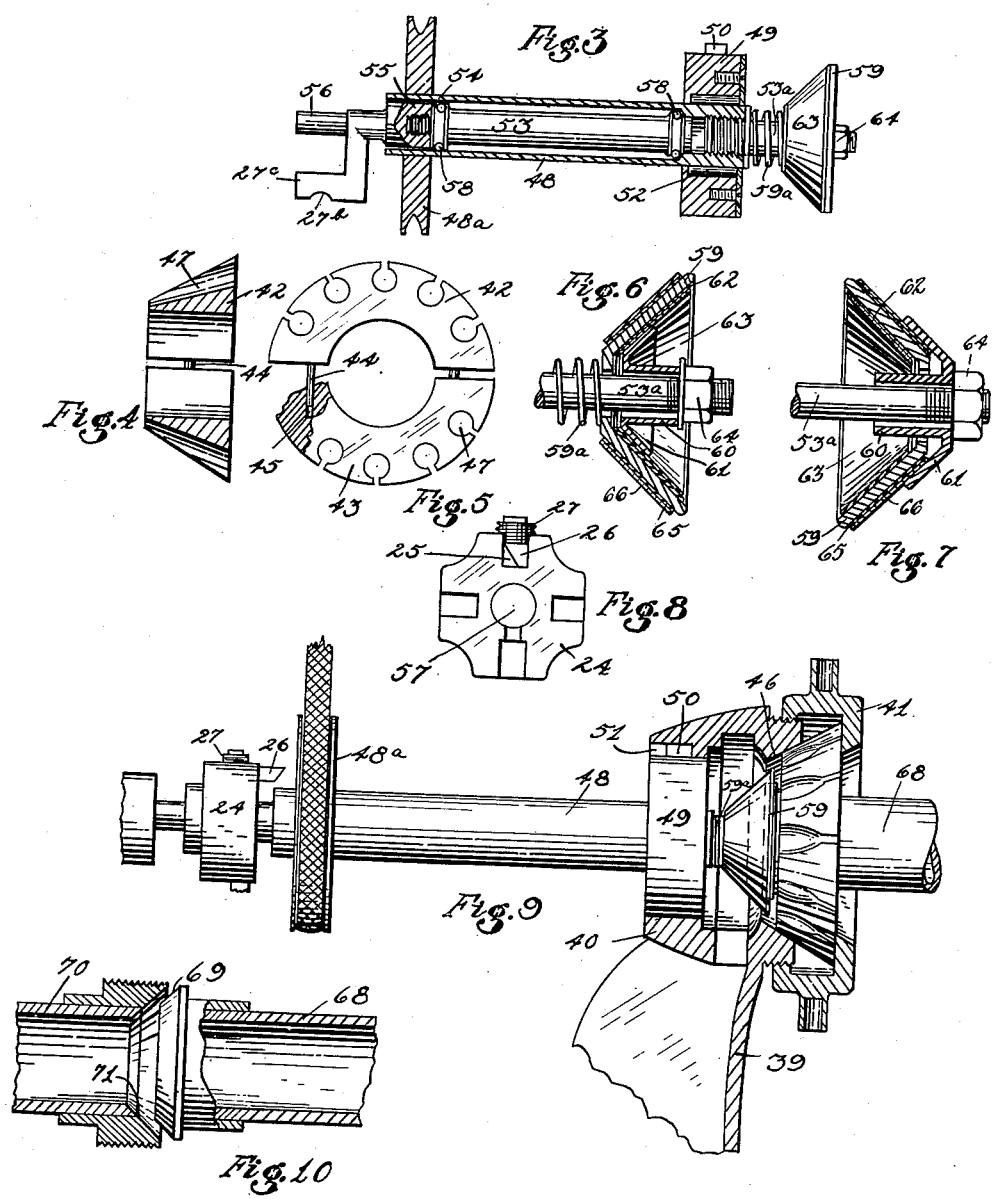

Patented June 3, 1941

2,243,976

UNITED STATES PATENT OFFICE 2,243,976

PIPE END CUTTING AND GRINDING MACHINE

Raymond P. Norton, Algona, Iowa

Application October 16, 1939, Serial No. 299,659

5 Claims. (Cl. 29—26)

In creameries there are pipe lines for conducting milk, and these pipe lines are made of a number of pipes fitted together. At the joints between these pipes, deposits of milk are formed, and for sanitary reasons the pipes are frequently, sometimes daily, separated for cleaning such deposits from the ends of the pipes. It is desirable that such removal of deposits be made by abrasion to fully remove all traces of such deposits.

In servicing pipes of this character it is desirable that the pipe ends be ground at frequent intervals and that after several such grindings they be re-cut to a predetermined shape.

The object of my invention is to provide a combined cutting and grinding machine, of simple, durable and inexpensive construction, which may be readily, quickly and easily adjusted to position for performing either the cutting or the grinding operation, and to very materially increase the speed of rotation for the grinding operation relative to that of the cutting operation.

These milk-conducting pipes at the present time are made of stainless steel which is very hard and tough, which makes it difficult to accurately cut it to the desired shapes and also to re-cut after usage for bringing it back to accurate shape, and one of my objects is to provide a machine specially designed to operate on such material to produce a finished product of greatest accuracy and smoothness.

A further object is to provide a machine of this class in which the pipe to be serviced may be readily, quickly and easily placed and firmly held in an accurate predetermined position so that each time that a pipe is thus held it will be in exactly the same position, and further to provide means whereby the cutting tool and also the grinding tool will be accurately positioned and held relative to the pipe, whereby both the pipe and tool will have the same relative positions each time that the pipe is being serviced, so that a relatively large number of grinding operations to remove surface deposits may be made without distorting the contacting surfaces or the pipe ends, and whereby the number of cutting operations for re-shaping the pipe ends may be reduced to a minimum.

A further object is to provide a machine of this class in which the cutting tool is firmly held in accurately centered position and in which the grinding tool may be readily, quickly and easily applied and removed without removing the cutting tool, and in which the cutting tool supports one end of the grinding tool so that the two tools are always held in exactly the same centered position relative to the pipe being serviced.

In the accompanying drawings—

Figure 1 shows a side elevation, partly in section, illustrating my improved machine; dotted lines show the positions of the grinding tool and pipe; also the position of the motor and its support when tilted to apply the driving belt to the cutting tool pulley is shown by dotted lines;

Figure 2 shows a longitudinal sectional view of the gearing mechanism for driving the cutting tool shaft;

Figure 3 shows a longitudinal sectional view of the grinding tool holder, the grinding tool being shown in position therein;

Figure 4 shows a sectional view of the pipe-gripping and centering device;

Figure 5 shows an end view of same, with a part broken away to show the guide pin;

Figure 6 shows a sectional view of the grinding tool, a portion of its supporting shaft being also shown;

Figure 7 shows a similar view with the tool in its reversed position on the shaft;

Figure 8 shows an end view of the cutter tool head;

Figure 9 shows a side elevation of the cutter tool, the grinder tool, the grinder tool-supporting bearing and the pipe-gripping and centering head, the pipe support being shown in section; and Figure 10 shows a side view, partly in section of the adjacent ends of two pipes of the kind to be serviced by my machine.

The machine comprises a base 10, upon which is slidingly mounted the tool support 11 which is held in position by a bolt 12. At the upper portion of the tool support is a cylindrical body portion 13. Rotatably mounted therein, at one end, is the gear wheel 14 having a square opening at its center into which is inserted the squared end 15 of the cutter tool shaft 16. In mesh with the gear wheel 14 is a worm gear 17 on the shaft 18, and a series of pulleys 19, of different diameters, is fixed to the other end of this shaft. At the other end of the cylindrical body 13 is a screw-threaded opening 20 into which is mounted a nut 21, having a hand wheel 22 fixed thereto. Fixed to the shaft 16 beyond the nut 21 is a collar 23 in engagement with the nut 21. By adjusting the nut, the tool shaft 16 may be moved outwardly from the tool support.

The cutting tool comprises a body 24 mounted on the shaft 16 and having a recess 25 in which is placed the cutter tool 26, held by a screw 27. For the purpose of manually withdrawing the grinding tool from contact with a pipe to remove the abrasive material loosened by use of the grinder, I have provided a handle 27a pivoted to the body 24 and entering a notch 27b in the extension 27c (see Fig. 3) of the grinding tool hereinafter described. Mounted on the top of the tool support is a motor support, comprising a base member 28 having a pivot 29 extended downwardly into a cylindrical opening in the tool support.

For holding the base member in different positions of its adjustment I have provided a pin 30, slidingly mounted to enter an opening 31 in the pivot 29. Hinged to the base member 28 is an upper base member 32.

A motor 33 is mounted on the base member 32, and on its shaft is a series of pulleys 34, of different diameters. For holding the member 32 against tilting movement I have provided a slide rod 35, mounted in the member 32 and having a handle 36 and a latch 37. This latch is normally held in latched position under the member 28, by a spring 38, as shown in Figure 1.

Slidingly mounted on the base 10 is the pipe support 39, having at its upper end a cylindrical body portion 40 having its outer end screw-threaded on its exterior to receive the clamping head 41.

The means for gripping and centering a pipe is illustrated in Figures 4, 5 and 9. It comprises two semi-cylindrical jaws 42 and 43, one of which has two guide pins 44 which enter the guide opening 45 in the other jaw. The outer surfaces of the jaws are tapered to form a wedging engagement with the tapered surface 46 of the body 40, as shown in Figure 9. These jaws are formed with slots 47 on their outer surfaces, which make them somewhat flexible. To illustrate: When a pipe is inserted between the jaws and placed in the body 40 against the tapered surface 46 and the clamping head screwed up tight, the jaws will assume an outline which accurately fits against the entire outer surface of the pipe and firmly holds the pipe in a position accurately centered within the body 40.

My improved grinding tool comprises a tubular shaft 48 having a pulley 48a fixed thereto. At its outer end it is internally screw-threaded to receive the grinding tool head. This outer end is rotatably mounted in a bearing block 49 which is provided with an outwardly extended lug 50, to enter a slot 51 in the body 40, to hold it against rotation. Between the shaft 48 and the block 49 are roller bearings 52. Within the tubular shaft 48 is a supporting bar 53, having a screw-threaded extension 54 at its one end, screwed into the block 55 which has a bearing 56 to be inserted into the opening 57 in the cutting body 24. Between the supporting bar 55 and the tubular shaft 48 are the ball bearings 58. Fixed to this block 55 is the extension 27c having a notch 27b before described. The lever 27a on the body 24 enters this notch 27b, and a slight movement of the lever forces the extension 27c longitudinally, thereby advancing or retracting the grinding head.

The grinding head comprises a cone shaped body 59 loosely mounted on the shaft 53a. A collar 60, having a flange 61, is mounted on the shaft 53, and the flange is substantially parallel with the interior of the body 59. The said body 59 is free to slide on the shaft 53a, and is yieldingly held at its outer limit of movement by the spring 59a. Between said flange and body is a layer of felt 62, and a layer of abrasive material 63, such as emery-cloth. These layers are firmly clamped and held between the flange and body, and may be removed and replaced upon removal of the nut 64. On the outer surface of the body 59 is another layer of felt 65, and abrasive 66. The shaft 53a is screwed into the end of the bottom shaft 48 and rotates with it.

In Figure 10 I have illustrated the adjacent portions of two pipe ends of the kind to be serviced by my machine. The pipe 68 has an inwardly inclined surface 69 at its end and the pipe 70 has an outwardly inclined surface 71 at its end.

In practical use, and assuming that it is desired to service a number of pipes, first cutting and then grinding them, the machine is first placed in the position shown by dotted lines in Fig. 1, with the pulleys 34 and 19 connected by the belt 72. The motor speed is substantially reduced by the worm gear. The gripping jaws 42 and 43 are applied to the pipe, and the pipe is centered and firmly held by tightening the screw cap 41. The cutting tool is then advanced and retracted relative to the pipe, and the contacting surface of the pipe is cut to the desired shape after the manner of a lathe. When all of the pipes have been cut in this manner the motor is moved to position for operating the grinder tool. This is accomplished by pulling the latch rod 35 outwardly, thereby permitting the base of the motor to tilt and thereby free the belt from the pulley 19. Then the locking pin 30 is withdrawn, thus freeing the pivot 29. The operator then swings the motor to the position shown in solid lines in Figure 1. Then the shaft member 56 is inserted in the opening 57 in the cutting tool, and the head 49 of the grinding tool is inserted in the body 40 and the belt applied to the pulley 48a, as shown in Figure 9. The pipes to be serviced are then inserted in the gripping jaws 42 and 43, and centered and firmly held by the gripping head 41. The spring 59a holds the abrasive surface of the grinding tool firmly against the pipe being serviced, and the entire grinding tool may be advanced by the hand wheel 22 in the same manner as the cutting tool alone is advanced.

With my improved machine I have demonstrated in use that a large number of pipes may be serviced in a minimum of time. Ordinarily they need only be ground at frequent intervals, and this may be done very quickly and easily with the grinding tool running at the high speed of the motor, by being belted directly to the motor. I attain great accuracy in this grinding operation because the pipes are accurately centered and firmly held by the gripping jaws, and the grinder head is yieldingly held by its spring so that it may travel smoothly and uniformly over the inclined surfaces of the pipe.

When it becomes necessary to cut the pipe surfaces, the belt is removed and placed on the pulley 19, the motor tilted and turned at right angles, and the belt applied to the pulley 19, the grinding tool is removed quickly and easily, and the machine is ready for the cutting operation.

With my improved machine I have demonstrated that the entire pipe-servicing operations in a large creamery may be done in much less time than that heretofore required, and that both the cutting and the grinding operations are accomplished with great accuracy.

I claim as my invention:

1. In a pipe end grinding tool, the combination of a support, a shaft carried by the support, a tubular grinder shaft on the exterior of the said shaft, anti-friction bearing devices between said shafts, a grinder tool carried by said tubular shaft, and means for rotating the tubular shaft independently of the shaft on which it is mounted.

2. In a machine of the class described, the combination of a main frame, a cutter tool rotatably mounted in the main frame, a second frame, a shaft detachably mounted at one end in the cutter tool and at its other end in the second frame, a tubular shaft surrounding said shaft, ball bearings between said shafts, a bearing block supported by the second frame and having said tubular shaft extended through it, roller bearings between the tubular shaft and the bearing block, a pulley on the tubular shaft for rotating it, and a grinder tool carried by the tubular shaft.

3. In a machine of the class described, the combination of a main frame, a cutter tool rotatably mounted in the main frame, a second frame, a shaft detachably mounted at one end in the cutter tool and at its other end in the second frame, a tubular shaft surrounding said shaft, ball bearings between said shafts, a bearing block supported by the second frame and having said tubular shaft extended through it, roller bearings between the tubular shaft and the bearing block, a pulley on the tubular shaft for rotating it, and a grinder tool carried by the tubular shaft, said second frame being formed with a recess to detachably receive said bearing block, and means for holding the bearing block against rotation when in said recess.

4. In a machine of the class described, a pipe-gripping and holding device, comprising a frame member having a cylindrical tapered portion in its interior, a gripping cap screwed to its exterior, a two-part pipe-gripping ring, one part having guide pins to enter openings formed in the other part, the outer surface of the ring being tapered to correspond with the taper on the interior of the cylindrical member, and said screw cap having a flange to engage the ring.

5. In a machine of the class described, a pipe-gripping and holding device, comprising a frame member having a cylindrical tapered portion in its interior, a gripping cap screwed to its exterior, a two-part pipe-gripping ring, one part having guide pins to enter openings formed in the other part, the outer surface of the ring being tapered to correspond with the taper on the interior of the cylindrical member, and said screw cap having a flange to engage the ring, said ring being formed with slots in its outer surface for giving it flexibility for adapting it to fit irregularly-shaped pipes.

RAYMOND P. NORTON.